(12) United States Patent
Wakefield et al.

(10) Patent No.: US 12,509,265 B2
(45) Date of Patent: Dec. 30, 2025

(54) FLAP-FOLDING MODULE FOR A FOOD PROCESSING LINE

(71) Applicant: THURNE-MIDDLEBY LTD, Norwich (GB)

(72) Inventors: James Paul Wakefield, Norwich (GB); Jacob Mark Wiggett, Norwich (GB); Matthew James Smith, Norwich (GB)

(73) Assignee: THURNE-MIDDLEBY LTD, Norwich (GB)

( * ) Notice: Subject to any disclaimer, the term of this patent is extended or adjusted under 35 U.S.C. 154(b) by 0 days.

(21) Appl. No.: 18/668,472

(22) Filed: May 20, 2024

(65) Prior Publication Data

US 2024/0391626 A1    Nov. 28, 2024

(30) Foreign Application Priority Data

May 26, 2023    (GB) .................................... 2307895

(51) Int. Cl.
     *B65B 49/16*      (2006.01)
     *B65B 25/06*      (2006.01)
     *B65B 65/00*      (2006.01)

(52) U.S. Cl.
     CPC .............. *B65B 49/16* (2013.01); *B65B 25/06* (2013.01); *B65B 65/003* (2013.01)

(58) Field of Classification Search
     CPC ....... B65B 24/16; B65B 25/06; B65B 65/003; B65G 41/002; B65G 41/005
     See application file for complete search history.

(56) References Cited

U.S. PATENT DOCUMENTS

| | | | |
|---|---|---|---|
| 3,079,144 A | | 2/1963 | Arthur |
| 4,279,611 A | * | 7/1981 | Labombarde .......... B65H 45/12 |
| | | | 493/438 |
| 4,342,182 A | * | 8/1982 | Dennis ................... B65B 49/16 |
| | | | 493/418 |
| 9,663,254 B2 | | 5/2017 | Sdahl et al. |
| 10,106,363 B1 | * | 10/2018 | Faust ...................... B65B 35/26 |
| 10,329,092 B2 | * | 6/2019 | Nothum, Jr. .......... B65G 41/005 |
| 10,661,994 B2 | * | 5/2020 | Nothum, Jr. ........... B65G 15/60 |

(Continued)

FOREIGN PATENT DOCUMENTS

| | | |
|---|---|---|
| DE | 102007036726 | 2/2009 |
| DE | 102011105583 | 12/2012 |

(Continued)

*Primary Examiner* — Andrew M Tecco
(74) *Attorney, Agent, or Firm* — Barnes & Thornburg LLP

(57) ABSTRACT

A flap-folding module for a food processing line is arranged to receive a food product lying on a sheet of material and to fold a portion of the sheet over the food product. A conveyor system carries the food product and sheet along a product flow path through the module. A gas jet outlet device provides a pulse of gas to raise a leading edge of the sheet, and an edge catch device receives the leading edge, temporarily retaining the leading edge whilst the food product passes beneath, thereby folding a leading portion of the sheet over at least part of the food product. The conveyor system comprises a mid-conveyor section and an upstream conveyor section which is upstream of the mid-conveyor section, and the upstream conveyor section is pivotable relative to the mid-conveyor section about a pivot axis which extends transversely across the product flow path.

15 Claims, 9 Drawing Sheets

(56) References Cited

U.S. PATENT DOCUMENTS

| | | | |
|---|---|---|---|
| 10,752,392 B2* | 8/2020 | Kuhmichel | B65B 25/06 |
| 10,889,444 B2* | 1/2021 | Nothum, Jr. | B65G 41/005 |
| 10,940,714 B2* | 3/2021 | Meyerhans | B43M 5/04 |
| 11,027,868 B2 | 6/2021 | Schmeiser et al. | |
| 11,279,562 B2 | 3/2022 | Ward et al. | |
| 11,427,357 B2 | 8/2022 | Meyerhans et al. | |
| 12,227,367 B2* | 2/2025 | Seager | B26D 7/0625 |
| 2011/0072764 A1* | 3/2011 | Daniek | B26D 7/2614 |
| | | | 53/556 |
| 2012/0324840 A1* | 12/2012 | Lang | B65G 47/244 |
| | | | 53/544 |
| 2017/0190449 A1 | 7/2017 | King et al. | |
| 2018/0015774 A1* | 1/2018 | Meyerhans | B65H 39/043 |
| 2018/0244012 A1 | 8/2018 | Ward et al. | |
| 2020/0002095 A1* | 1/2020 | Nothum, Jr. | A23P 20/12 |
| 2022/0242677 A1* | 8/2022 | Seager | B26D 5/007 |
| 2022/0297948 A1 | 9/2022 | Harding et al. | |

FOREIGN PATENT DOCUMENTS

| | | |
|---|---|---|
| DE | 102017117292 | 1/2019 |
| GB | 2255762 | 11/1992 |
| WO | 2022/152638 | 7/2022 |

* cited by examiner

FLAP-FOLDING MODULE FOR A FOOD PROCESSING LINE

CROSS-REFERENCE TO RELATED APPLICATIONS

This application claims priority from United Kingdom Patent Application No. 2307895.9, filed on May 26, 2023, the entirety of which is hereby fully incorporated by reference herein.

FIELD OF THE DISCLOSURE

The present disclosure relates to a flap-folding module for a food processing line and also to a food processing line for location downstream of a food slicing or portioning machine.

BACKGROUND TO THE DISCLOSURE

In some instances, groups of slices or portions of a food product may be presented to the consumer in a product pack in which the food product group is carried on a stiff sheet of material, such as a card or board. The card provides support for the group during its processing and subsequent transportation. In addition, labelling and marketing content can be provided on the surface of the card.

In particular, the card may be in the form of an "L-board" including an edge portion which is folded onto the upper surface of the food product group during preparation of the product pack. The L-board may be a flat sheet which includes a folding line defined by perforations or weakening of the board in another manner along a line which extends across the board. Each flap may be folded over by hand or by a flap-folding module in a food processing line. The L-board together with the food product group is then fed to a packaging station where they are packaged in an airtight manner.

When a group of food portions or slices is generated by a food slicing machine, it is preferable for the group to be presented in a shingled manner so that a part of each portion or slice will be visible to the consumer. In order to present a shingled group on an L-board in the correct orientation for handling by a particular flap-folding module, it may be necessary to rotate the L-board together with the food product group carried on the board through 180°, and thereby reverse its direction of presentation to the flap-folding module.

It is desirable for a food processing line to be able to manipulate and prepare a product ready for packaging at a high rate of throughput and in a reliable manner to minimise any downtime for the processing line.

SUMMARY OF THE DISCLOSURE

The present disclosure provides a flap-folding module for processing a food product lying on a sheet of material to fold a portion of the sheet over the product, the module comprising:
   a conveyor system to carry the food product and sheet along a product flow path through the module;
   a gas jet outlet device to provide an upward pulse of gas to raise a leading edge of the sheet as it passes over the gas jet outlet device; and
   an edge catch device located above the product flow path for receiving the raised leading edge, temporarily retaining the leading edge whilst the food product passes beneath the edge catch device, thereby folding a leading portion of the sheet over at least part of the food product, and then releasing the leading edge as the food product and sheet continue along the product flow path,
   wherein the conveyor system comprises a mid-conveyor section and an upstream conveyor section which is upstream of the mid-conveyor section, and the upstream conveyor section is pivotable relative to the mid-conveyor section about a pivot axis which extends transversely across the product flow path.

A flap-folding module having this configuration is able to fold over a leading portion or flap of each individual sheet as it passes through the module at high speed, in a reliable manner. Furthermore, the pivotable upstream conveyor section enables the flap-folding module to be located immediately adjacent to a rotatable component of an upstream rotation module. The pivoting action enables the upstream conveyor section to be selectively moved out of the rotation path of a product support surface of a rotation module. The flap-folding module can then be located closer to the rotation module in a more compact configuration, without requiring vertical motion of the product support surface to avoid contacting the conveyor system of the flap-folding module. Otherwise, such vertical motion could cause disturbance of the products on the product support surface, potentially causing them to shift out of position which could lead to handling errors downstream.

The pivot axis of the conveyor system of the flap-folding module may be perpendicular to the direction of product travel along the product flow path through the module. The conveyor system may define a product support plane and the pivot axis may be parallel to that plane.

The upstream conveyor section of the flap-folding module is preferably pivotable downwardly relative to the mid-conveyor section of the flap-folding module, to a location beneath the product flow path. This is so that if any product is fed to the upstream conveyor section whilst it is in its pivoted orientation, the product will fall onto the conveyor, instead of passing beneath the conveyor which would make the displaced product difficult to retrieve.

The conveyor system of the flap-folding module may include at least two sets of conveyor belts, with the belts of a first set arranged alternately with belts of a second set across the product flow path, and with upstream portions of the first set extending further upstream than the upstream ends of the second set. In a preferred configuration, only belts of the first set extend into the upstream conveyor section. As the belts of the first set extends further upstream than the belts of the second set, this allows a gas jet outlet device to be located between adjacent spaced apart lengths of two belts of the first set. The second set increases the total amount of belt in contact with each product as it passes through the flap-folding module, thereby reducing the risk of slippage between the conveyor system and the product. The upstream portions of the first set (which extend further upstream than the upstream ends of the second set) may be located in the pivotable section of the conveyor system. This provides a compact configuration, enabling a gas jet outlet device to be located beneath the pivotable upstream conveyor section.

The gas jet outlet device may be arranged to provide an upward pulse of gas between the upstream portions of at least two of the belts of the first set. Gas jet outlets or outlet devices may be provided at a plurality of locations extending laterally across the product flow path to increase the reliability and uniformity with which a flap of a sheet passing over the outlet devices is lifted. This may also increase the speed at which the flap can be lifted, thereby enabling a higher throughput through the flap-folding module.

Downstream portions of the second set of belts may extend further downstream than the downstream ends of the first set of belts.

Each belt of the first set of belts may extend around a drive roller which is located at the downstream end of the belts, and each belt of the second set of belts may extend around a drive roller which is located at the upstream end of the belts. In preferred examples, each belt of the first set of belts extends around a nose roller which is located at the upstream end of the belts, and each belt of the second set of belts extends around a nose roller which is located at the downstream end of the belts, and the diameter of the nose roller associated with each belt is less than the diameter of the respective drive roller. In this way, a drive roller for each set of belts may be spaced from the outermost ends of each set of belts, with narrower nose rollers provided at the outermost ends of the conveyor system. As a result, a smoother transition is provided between each end of the flap-folding module and the respective adjacent module, whilst enabling each set of belts to be driven with a drive roller having a greater diameter and therefore a longer circumference to engage an associated belt. The drive rollers for both sets of belts are preferably driven by a common drive motor to ensure that they are driven at equal velocities.

The upstream conveyor section of the flap-folding module may include a set of pivotable arms, each having a nose roller located at its distal end, with a belt of each of the first set of belts extending around a respective nose roller. The provision of an individual nose roller for each belt facilitates the removal of each belt for cleaning or maintenance purposes.

The present disclosure also provides a food product processing line comprising a flap-folding module as described herein and an adjacent rotation module upstream of the flap-folding module, wherein the rotation module comprises:
  a product conveyor for conveying food products in a conveyance direction through the rotation module, wherein the product conveyor defines a product support surface;
  a rotation module base; and
  a product conveyor support for carrying the product conveyor, wherein the product conveyor support is rotatably mounted on the rotation module base for rotation about a rotation axis which is perpendicular to the product support surface.

The product conveyor support may be rotatable relative to the rotation module base about the rotation axis through 180°.

In a preferred example of the processing line, the upstream conveyor section of the flap-folding module is pivotable between raised and lowered configurations, and the flap-folding module and rotation module are configured such that when the upstream conveyor section is in its raised or "in-line" configuration, food products conveyed along the product flow path by the product conveyor flow onto the upstream conveyor section, and when the upstream conveyor section is in its lowered or "below-line" configuration, the product conveyor is able to rotate relative to the rotation module base without contacting the upstream conveyor section.

The product conveyor support may be configured to rotate from an original orientation with its conveyance direction aligned with the product flow path, through 180° in one direction about the rotation axis relative to the rotation module base, to a rotated orientation in which its conveyance direction is again aligned with the product flow path, and then rotate through 180° in the opposite direction about the rotation axis back to its original orientation.

In a preferred example, the product conveyor is configured to convey food products along the product flow path in its original orientation and is reversible to convey food products in the same direction along the product flow path in its rotated orientation.

A flap-folding module or a food product processing line as described herein may be provided in combination with a pitch adjustment conveyor which is (preferably adjacent to and) downstream of the flap-folding module, wherein the pitch adjustment conveyor is configured to reduce the pitch between consecutive food products relative to the pitch between consecutive food products travelling through the flap-folding module. Once the flap of the sheet underlying the food product has been folded onto the food product, the footprint of the sheet is reduced, leaving a larger gap between consecutive products. The pitch adjustment conveyor enables reduction of this gap so that products can be fed to a packaging station more closely together. The reduced gap may be selected to correspond to the format required by the packaging station. The packaging station will tend to have a small spacing between adjacent product packs to minimise wastage of a packaging film sheet laid over each set of product packs.

The pitch adjustment conveyor may be configured to carry food products along the product flow path at a lower velocity than the flap-folding module. This leads to reduction of the distance between consecutive products.

In another example, the pitch adjustment conveyor is configured to carry food products along the product flow path at a first velocity during the transfer of a food product from the flap-folding module to the pitch adjustment conveyor and to carry food products at a second velocity between the transfer of consecutive food products from the flap-folding module to the pitch adjustment conveyor, wherein the second velocity is less than the first velocity. Preferably, the first velocity matches that of the conveyor system of the flap-folding module to minimise the risk of slippage as a product is transferred from one module to the other. As the second velocity is lower than the first velocity, the distance between consecutive products is reduced.

The present disclosure further provides a method of operating a food processing line as described herein, comprising the steps of:
  lowering the upstream conveyor section to its lowered configuration;
  rotating the product conveyor of the rotation module about its rotation axis; and
  raising the upstream conveyor section to its raised configuration.

In this manner, the upstream conveyor section of the flap-folding module may be moved out of the rotation path of the product conveyor as the product conveyor rotates, and then the upstream conveyor section is returned to its raised configuration, and the height of the product conveyor stays constant during these steps. This provides a compact configuration as the flap-folding module is located next to the rotation module, whilst avoiding the need to vertically displace the product conveyor, thereby reducing the likelihood of shifting the position of the products on the product conveyor.

BRIEF DESCRIPTION OF THE DRAWINGS

Examples of the present disclosure will now be described with reference to the accompanying schematic drawings, wherein.

DETAILED DESCRIPTION

Figure 1:
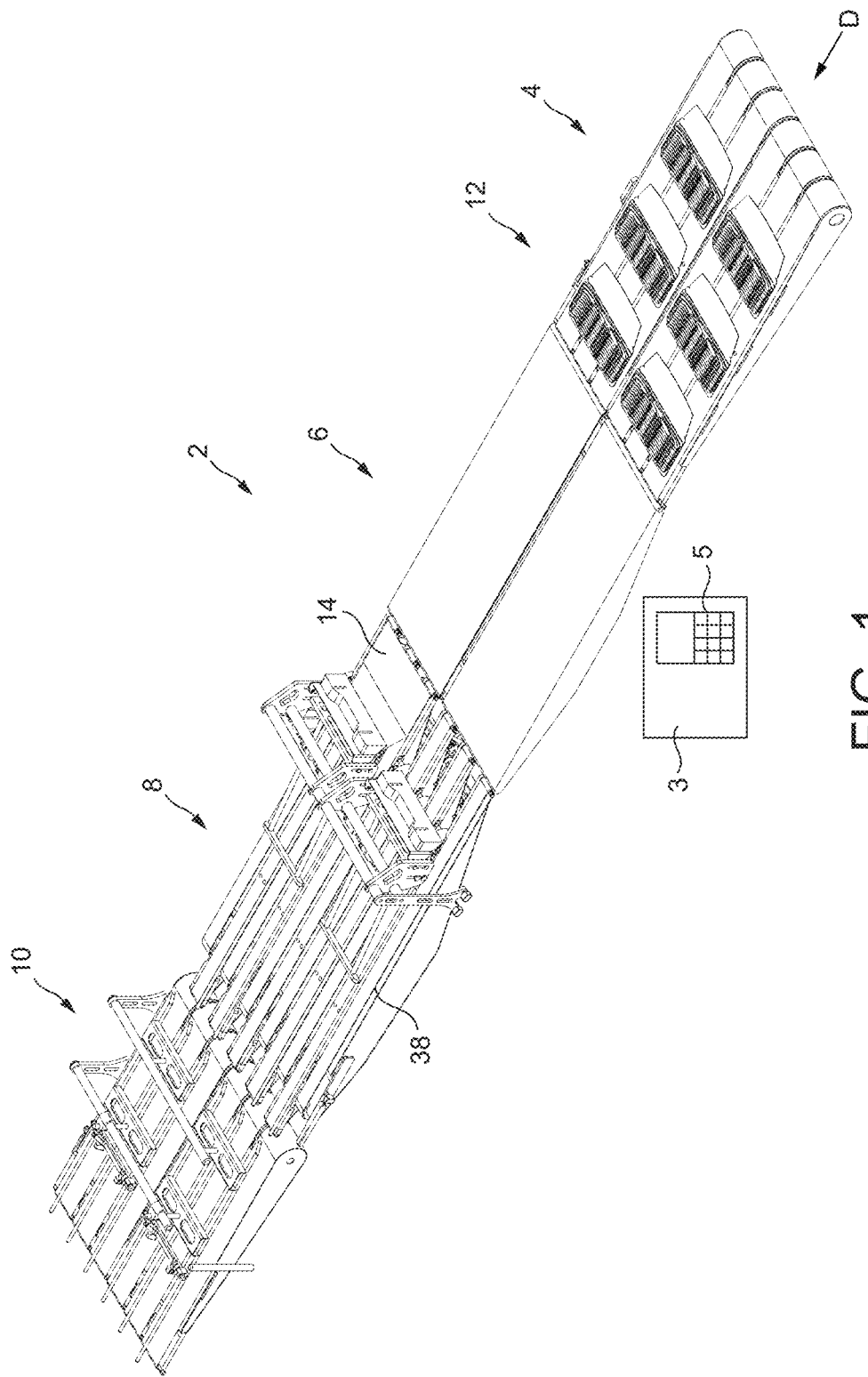
FIG. 1 is a perspective view of a processing line according to an example of the present disclosure.

The processing line 2 shown in FIG. 1 is a system configured to receive food product groups lying on respective sheets of material and then process the groups before feeding them to a packaging station (not shown). The processing line, along the direction (D) of the product flow path, comprises a buffer conveyor 4, a rotation module 6, a flap-folding module 8 and a pitch adjustment conveyor 10. The overall operation and interaction of the components of the processing line system is controlled and co-ordinated by a programmable logic controller 3 having an operator interface 5. The processing line is capable of handling products at high speed, achieving a throughput rate of typically over 100 product packs/minute.

In the example shown in FIG. 1, the processing line receives product packs travelling along two parallel lanes. The processing line may be modified to handle a single lane only, or more than two parallel lanes.

Figure 2:
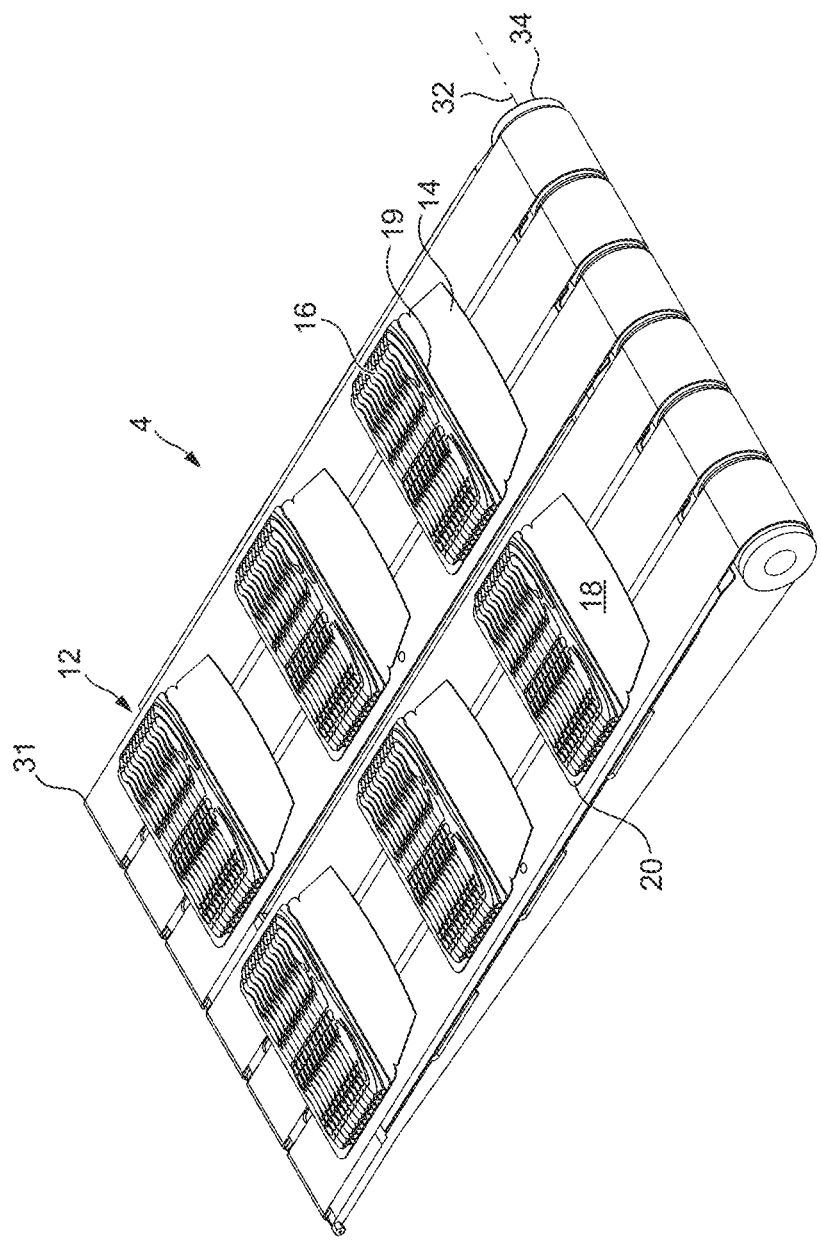
FIG. 2 is an enlarged perspective of the view of the buffer conveyor of the processing line shown in FIG. 1.

In FIG. 1, a set of product packs 12 in a 3 by 2 arrangement has been fed onto the buffer conveyor 4. It will be appreciated that different numbers of product packs may be arranged in each lane to form a set, depending on the size of the product packs and the configuration of the packaging station. An enlarged view of a representative buffer conveyor 4 is shown in FIG. 2. One of ordinary skill with a thorough review and understanding of this disclosure will readily appreciate that modification for a different number and arrangement of product packs (such as 4 by 2) of a similar size would entail increasing the length of the buffer conveyor 4 and the rotation module 6 to allow space for four product packs to be received along a line and then transferred onto the rotation module 6. Similarly, an arrangement of, for example, 4 by 4, could be achieved by including four parallel rotation module conveyors (and related upstream and downstream structure discussed herein to receive four lanes of product packs simultaneously), as well as through use of a longer rotation module 6 if needed. In this example, the four conveyors of the rotation module may pivot as a single unit (as discussed herein) or may include two portions (e.g. a right portion and left portion when looking along the product path) that pivot separately to allow rotational motion of the two portions.

Each product pack may consist of, for example, a sheet 14 of material, with a shingled group 16 of product slices lying on top of the sheet. Other package sizes, to accept shingled groups with a differing number of slices and/or slice sizes, may be used by the processing line 2. A first slice, at the leading end of each group, lies directly on the sheet, with each successive slice lying on top of the preceding slice, and displaced slightly along the direction of product flow relative to the preceding slice, to form a shingled group. The last slice of each group is therefore located at the trailing end of each group. The sheet 14 is divided into a flap 18 and a main portion 20 by a folding line 19. The group of slices is located on the main portion of the sheet, with the flap projecting beyond the trailing end of the group of slices in the upstream direction.

Figure 3:
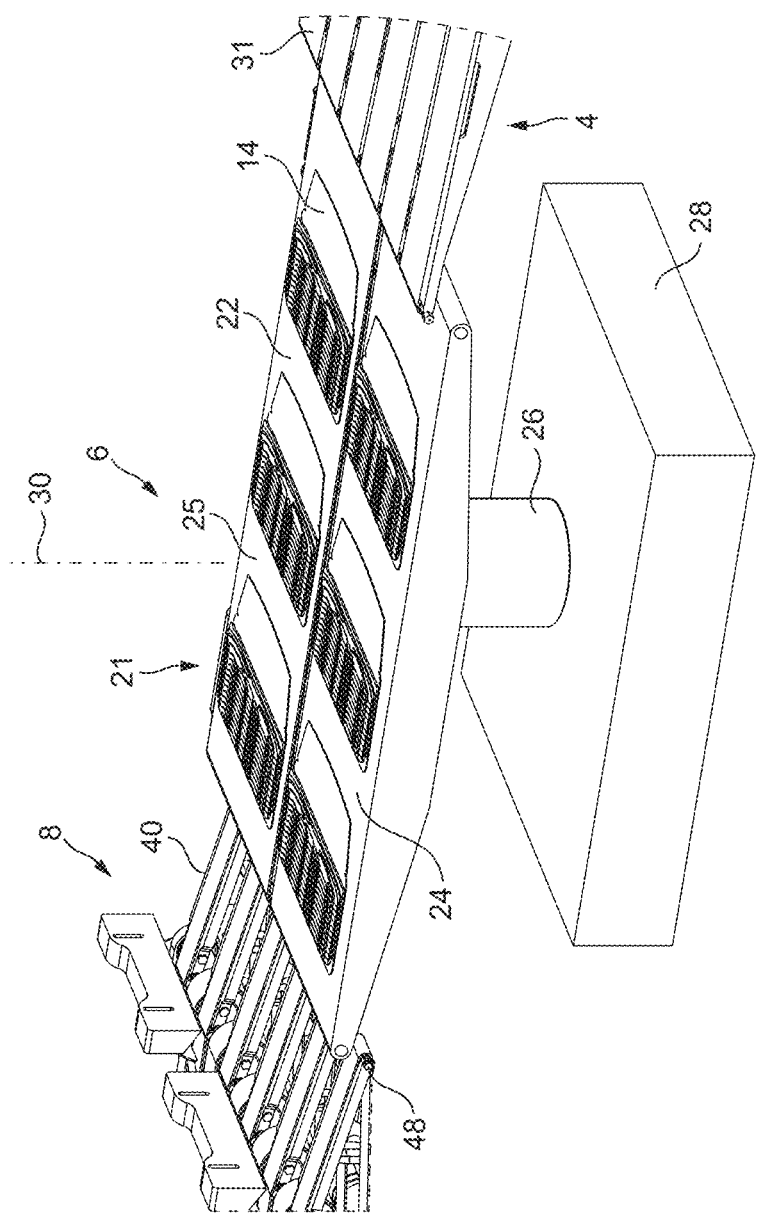
FIGS. 3 to 5 are enlarged perspective views of the rotation module of the processing line shown in FIG. 1, at successive stages in rotation of its product conveyor.

In FIG. 3, the set of product packs 12 has been conveyed by the buffer conveyor 4 onto the rotation module 6. The rotation module includes a reversible product conveyor system 21 which includes two conveyor belts 22 and 24, one for each lane. Upwardly facing surfaces of the conveyor belts form a product support surface 25 on which the set of product packs rests. The use of a single conveyor belt for each lane maximises the area of contact between each product pack and the belts. This enhances the control of the position of each product pack and minimises the risk of a product pack shifting from the intended position during operation of the rotation module. The product conveyor system 21 is carried by a product conveyor support 26 which is rotatably mounted on a rotation module base 28 for rotation about a vertical rotation axis 30. The rotation module base includes a servo drive motor to provide accurate control of the position and acceleration of the product conveyor support relative to the base.

The rotation module is arranged, in some examples, to be able to rotate the product conveyor system 21 clockwise (when viewing the conveyor system from above the conveyors) through 180° about axis 30 in order to reverse the orientation of the product packs 12 relative to the product flow path. The conveyor belts 22 and 24 can then be driven in reverse to transfer a set of product packs carried by the product conveyor system onto the next module, namely the flap-folding module 8. Once this transfer has been completed, the product conveyor system 21 is ready to receive the next set of product packs from the buffer conveyor 4. The product conveyor system 21 is then rotated through 180° in an anticlockwise direction about axis 30 to return the product conveyor system to its original configuration, thereby reversing the orientation of the next set of product packs. Alternatively, an anticlockwise 180° rotation may be followed by a clockwise 180° rotation about axis 30.

The rotation module may be arranged to only execute 180° rotations such that it is only able to move between and select orientations that are in-line with the product flow path through the processing line so as to fulfil its product pack reversal function as part of the processing line.

The flap-folding module is adapted to accommodate rotation of the adjacent product conveyor system. An upstream conveyor section 40 of the flap-folding module is pivotable so as to move its leading end 48 downwardly out of the path followed by the product conveyor system 21 as it rotates, as described in further detail below.

In addition, the buffer conveyor 4 is able to raise its trailing end 31. The buffer conveyor is pivotable about a horizontal, transverse axis 32 at its leading end 34. The buffer conveyor is in its raised orientation in FIG. 3. It has been moved clear of the rotation path of the product conveyor system 21. By pivoting the whole of the buffer conveyor, the amount of rotation required to raise the trailing end by a given distance is minimised, thereby maintaining close control of the positions of the product packs.

Figure 4:
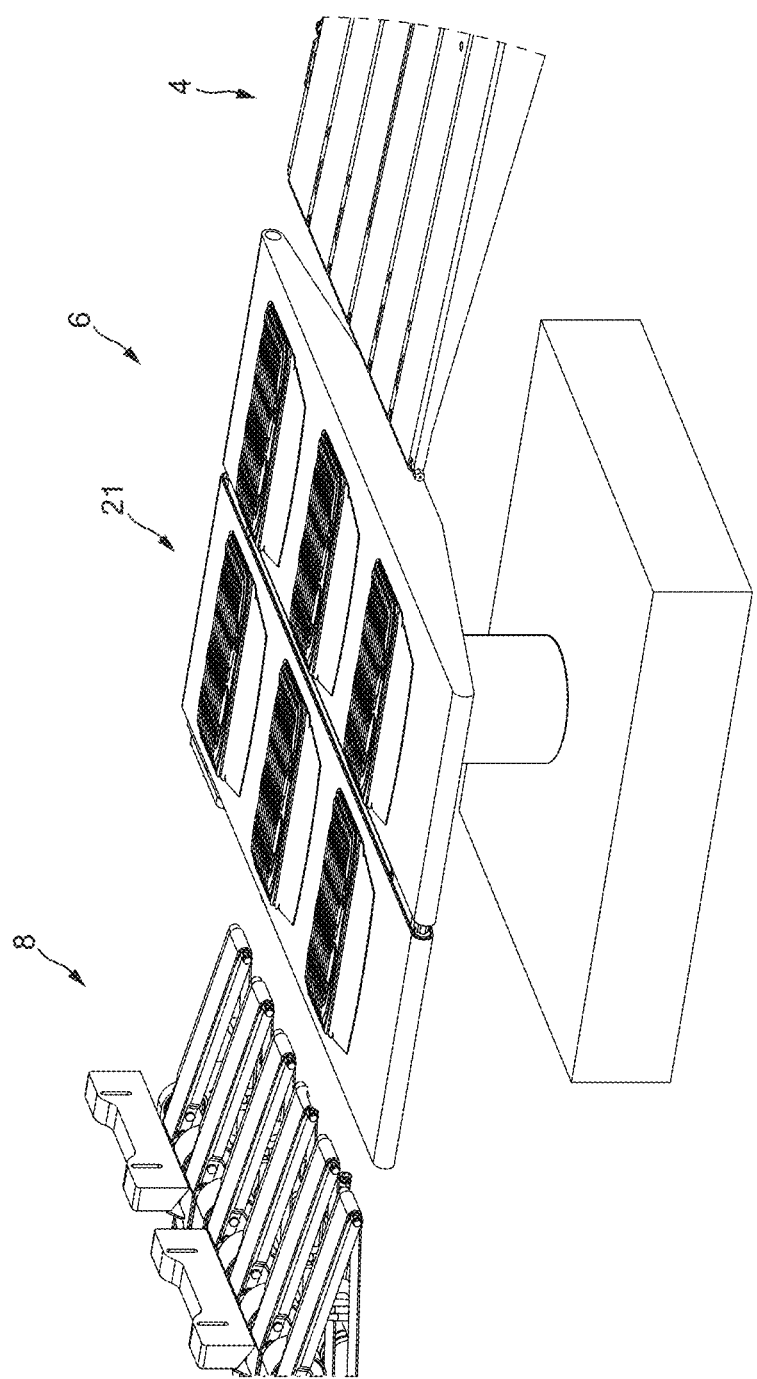

FIG. 4 shows the product conveyor system 21 after rotation through 90° in a clockwise direction about axis 30 (when viewed from above).

Figure 5:
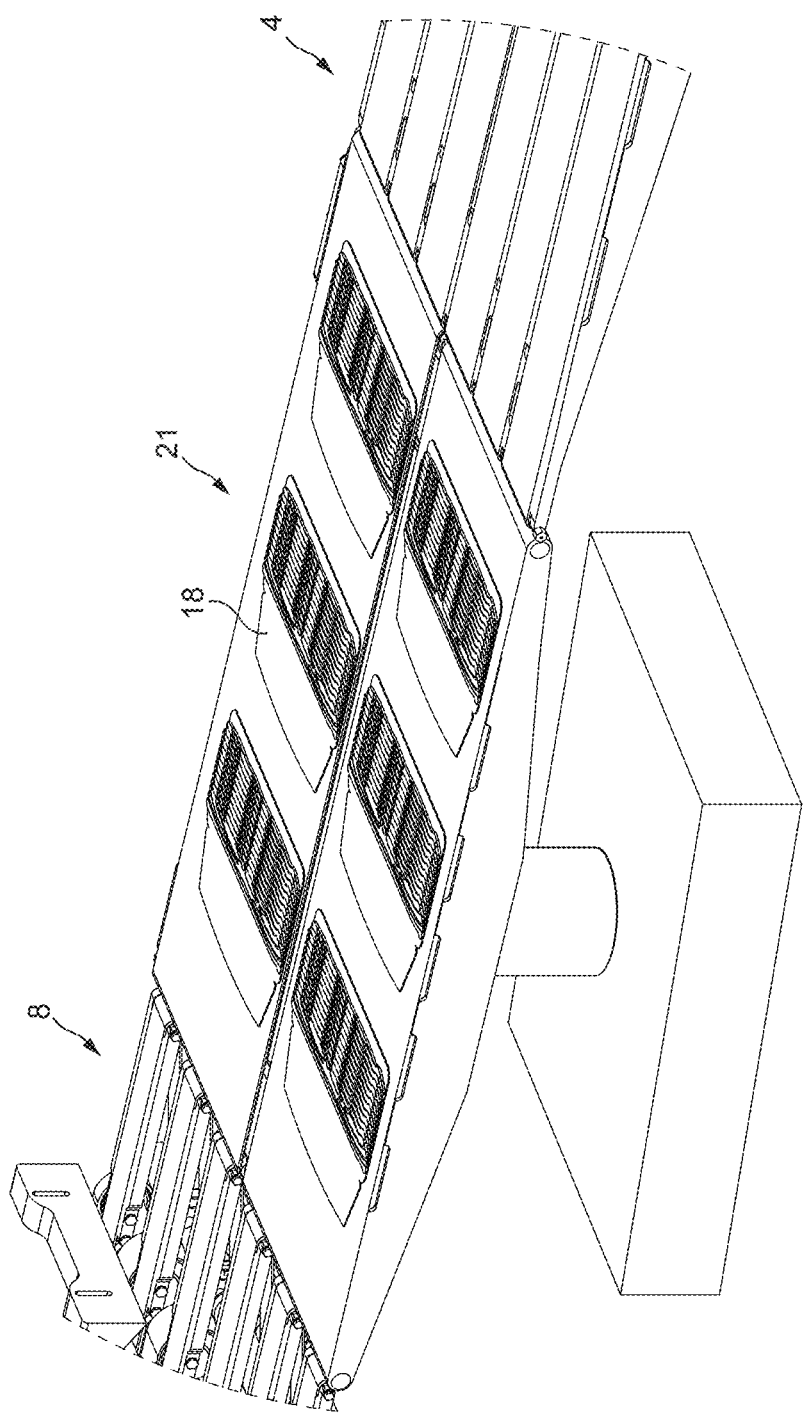

FIG. 5 shows the product conveyor system 21 after completion of its rotation through 180°. As a result, it can be seen that the flap 18 of each product pack is now located at the leading end of the product pack.

Figure 6:
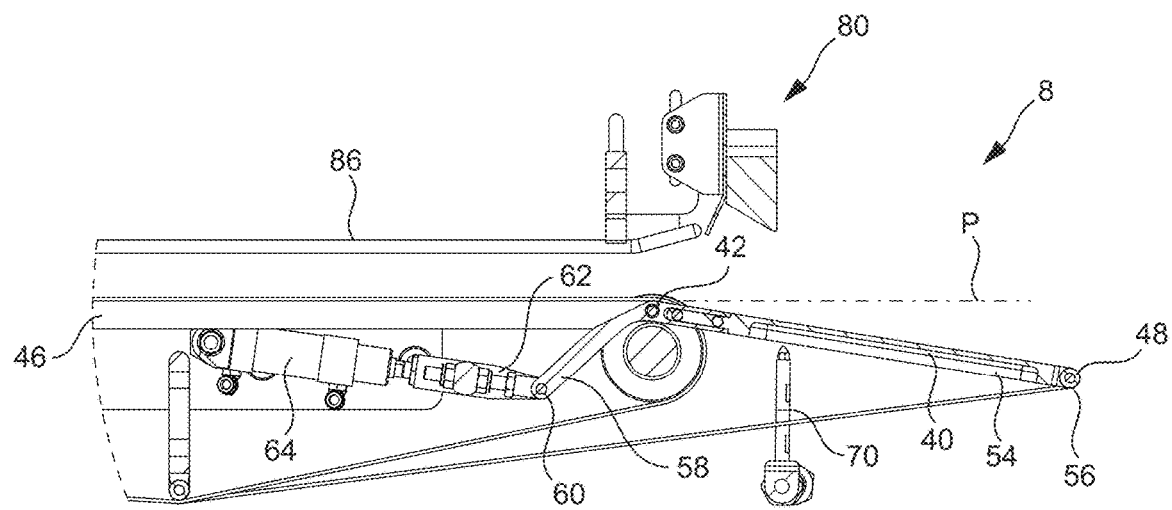
FIGS. 6 and 7 are a partial cross-sectional side view and a side view, respectively, of the upstream end of the flap-folding module of the processing line shown in FIG. 1.
Figure 7:
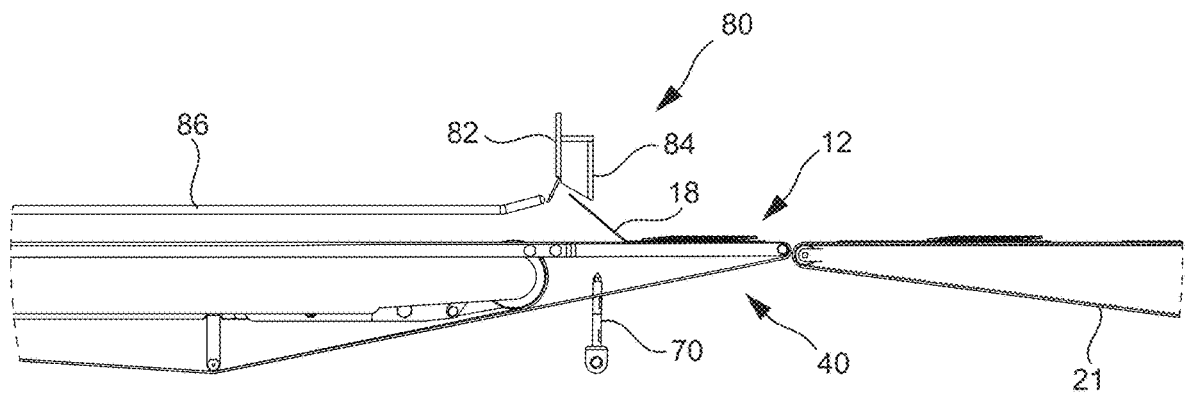

FIG. 6 shows the upstream end of the flap-folding module 8, with an upstream conveyor section 40 in a downwardly pivoted orientation. The upstream conveyor section is able to pivot about a pivot 42, which lies on a pivot axis 44 (marked in FIG. 8), relative to a mid-conveyor section 46 of the conveyor system 38 of the flap-folding module. The pivot axis 44 extends transversely across the product flow path. With the upstream conveyor section in this configuration, its leading end 48 is lowered below the plane "P" of the product flow path. This allows the product conveyor system 21 of the adjacent rotation module to rotate whilst maintaining its product support surface 25 in the plane of the product flow path. Once the product conveyor system of the rotation module has rotated through 180°, the upstream conveyor section of the flap-folding module is then returned to its raised orientation, with its upper surface lying in the plane of the product flow path, as shown in FIG. 7.

The conveyor system 38 of the flap-folding module includes two sets of conveyor belts. A first set 50 is arranged alternately with a second set 52 across the product flow path (see FIG. 8). The first set of belts has upstream portions which extend further upstream than the upstream ends of the belts of the second set and these upstream portions are located in the pivotable upstream conveyor section 40. The upstream portions of each belt of the first set extends around a respective pivotable arm 54 which has a nose roller 56 at its distal end. The pivotable arm pivots about pivot 42. A drive arm 58 is rigidly fixed to the proximate end of the pivotable arm 54. The distal end 60 of the drive arm 58 is in turn pivotably coupled to a piston 62 which is reciprocated by a cylinder 64. In this way, the cylinder is operable to drive the drive arm 58 and therefore the pivotable arm 54 about the pivot 42 to lower and raise the upstream conveyor section 40.

A gas jet outlet device in the form of a set of nozzles 70 is provided below the product flow path through the upstream conveyor section. The nozzles are arranged to direct pulses of gas upwardly between the first set 50 of conveyor belts.

The flap-folding module 8 includes an edge catch device 80 which is located above the product flow path, and downstream of the nozzles 70. The edge catch device may comprise an upright flap folding bar 82 and an upright flap stopper 84. The flap stopper 84 is spaced from the flap folding bar 82 in an upstream direction and both of these components extend transversely across the product flow path.

As the flap 18 of a sheet 14 passes over the nozzles 70, a pulse of gas is ejected by the nozzles, which raises the flap as shown in FIG. 7. A perspective view of a sheet 14 with its flap raised is shown in FIG. 1 for the purposes of illustration. As the product pack 12 continues along the product flow path, the flap engages the flap folding bar 82. The product pack continues to move beneath the edge catch device as it is carried through the flap-folding module by the conveyor system 38. The flap is urged against the flap folding bar and is therefore folded over towards the food product. The leading edge of the flap then engages the flap stopper 84 whilst the body of the flap engages the lower end of the flap folding bar 82. This tends to bend the flap and increased the force exerted to fold the flap over, ensuring that a reliable fold is achieved along the folding line 19 of the sheet. The sheet is then retained in its folded configuration by a set of hold down guides 86 which are preferably in the form of cylindrical rods which extend along the product flow path downstream of the edge catch device 80.

A plurality of nozzles 70 may be arranged transversely across the product flow path. A nozzle configuration is shown by way of example in FIG. 8. Two or more nozzles (preferably three) may be provided between two adjacent belts of the first set 50 of belts to provide an impulse with sufficient force to raise a flap of a product pack travelling at speed over the nozzles quickly so that it is brought into engagement with the edge catch device. The nozzles may be arranged along a line extending transversely across the product flow path.

Figure 9:
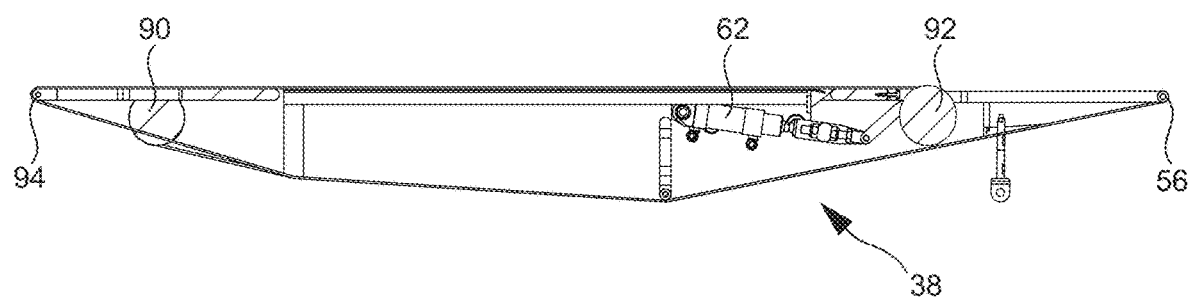

As shown in FIG. 9, the conveyor belts of the first set 50 extend around nose rollers 56 at their upstream ends and around a set of drive rollers 90 at their downstream ends. The conveyor belts of the second set 52 extend around a set of drive rollers 92 at their upstream ends and set of nose rollers 94 at their downstream ends. The two sets of belts are arranged in a staggered configuration such that the nose rollers 56 first set are located further upstream than the drive rollers 92 of the second set, and the nose rollers 94 of the second set are located further downstream than the drive rollers 90 of the first set. As a result, gaps defined between the spaced-apart upstream ends of the first set of belts to provide openings in the product flow path through which gas jets from the nozzles 70 can be directed. In addition, this configuration allows the relatively large diameter drive rollers to be located away from the upstream and downstream ends of the flap folding module, with relatively small diameter nose rollers used at these locations instead. This means that the conveyor system of the flap-folding module is able to extend its flat upper product surface closer to each adjacent module of the processing line. Furthermore, the provision of a second set of belts between the first set increases the surface area of belts in contact with each product pack to reduce the risk of a product pack shifting relative to the conveyor.

Figure 8:
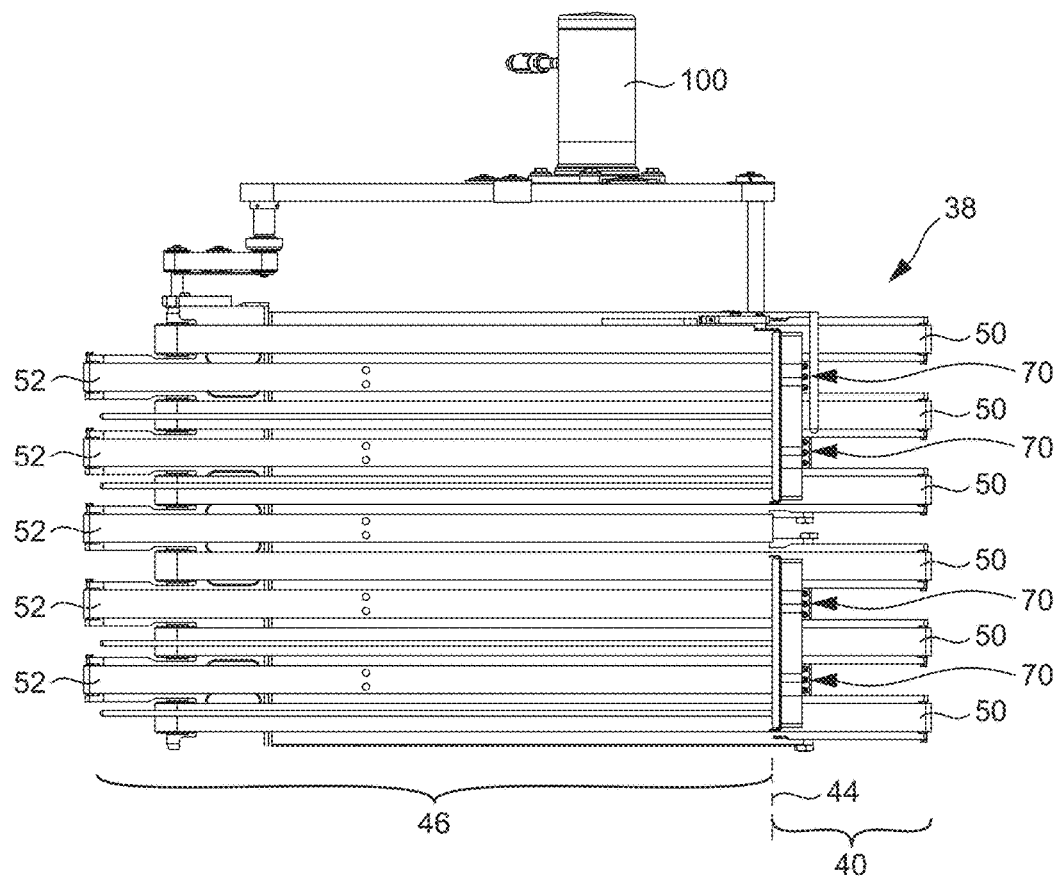
FIGS. 8 and 9 are a plan view and a side view, respectively, of the flap-folding module and its conveyor system.

Preferably, both sets of drive rollers 90, 92 are driven by a common drive motor 100 (see FIG. 8). This ensures that both sets of belts are driven at the same velocity and therefore the belt portions beneath a product pack remain stationary relative to the product pack as it is carried by the belts.

Figure 10:
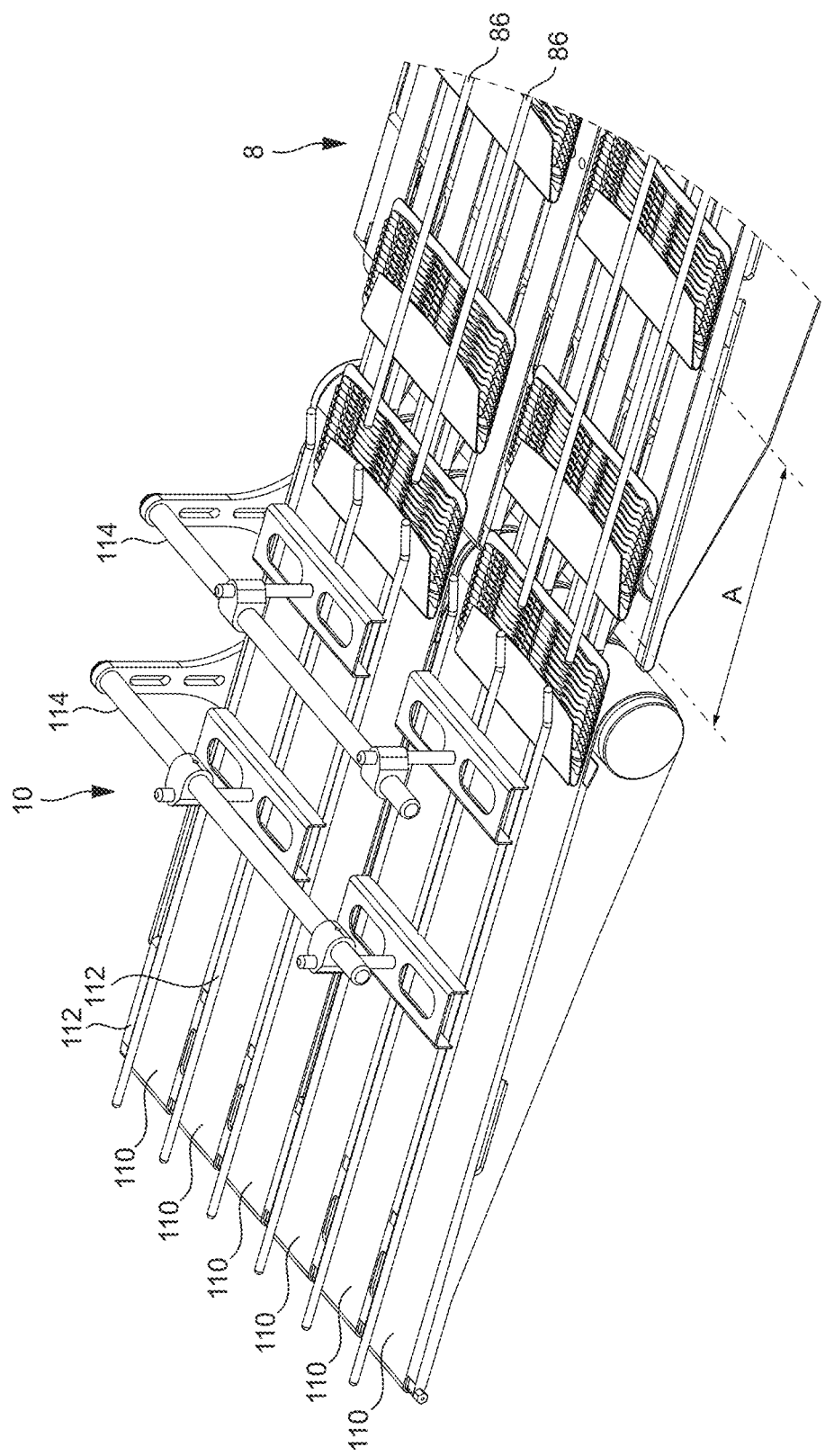
FIGS. 10 and 11 are perspective views of a downstream portion of the flap-folding module and the pitch adjustment conveyor of the processing line shown in FIG. 1.
Figure 11:
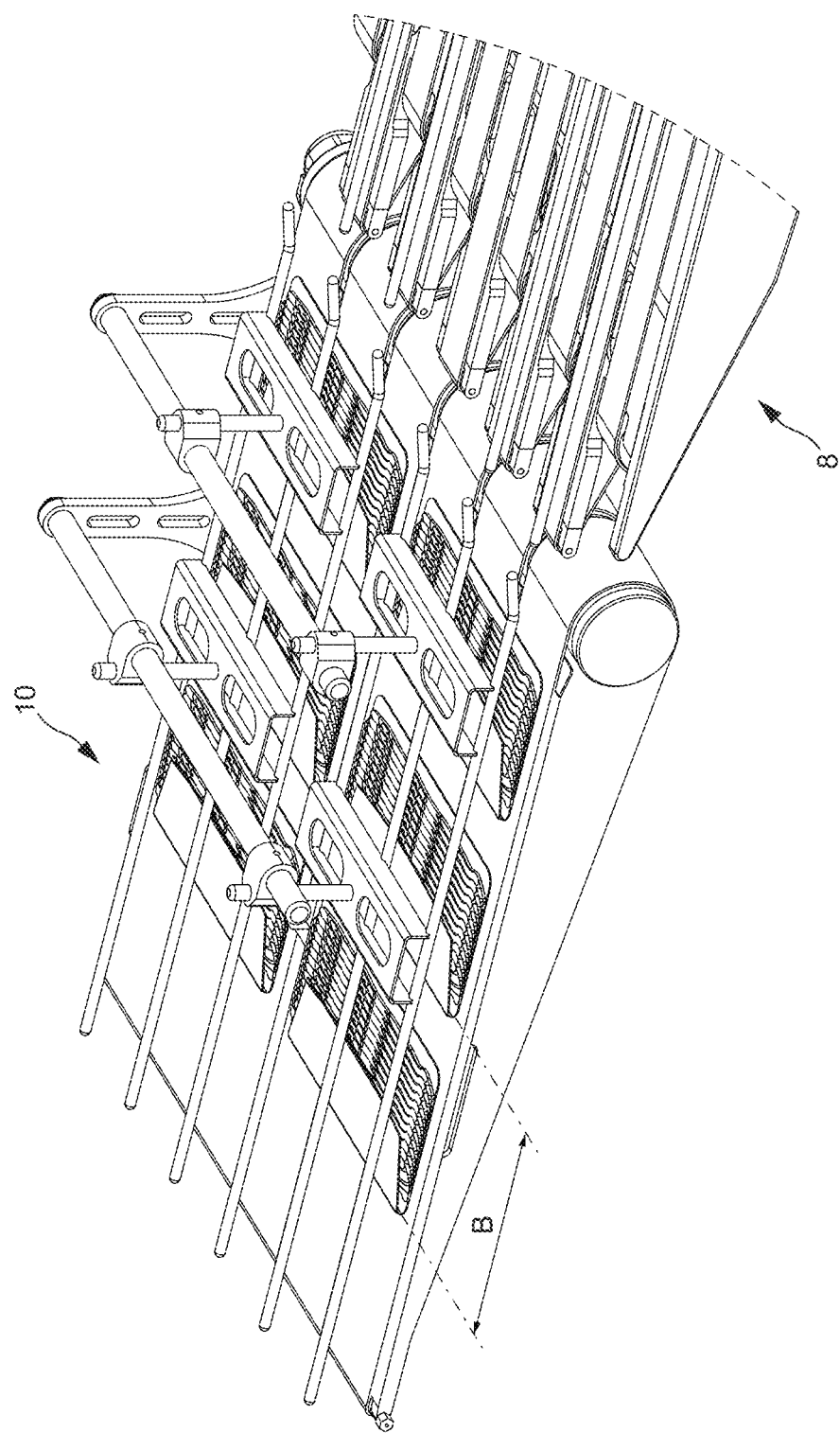

FIGS. 10 and 11 show an example of a pitch adjustment conveyor 10 which is located immediately downstream from the flap-folding module 8. The pitch adjustment conveyor includes a set of six conveyor belts 110. The speed of the conveyor belts is adjustable using the controller 3 of the processing line so as to change the pitch between consecutive product packs 12 travelling along the line. Once the flaps of product packs travelling along the line have been folded over, the spacing between consecutive packs will be greater. The spacings can be reduced to the required extent using the pitch adjustment conveyor. For example, the pitch may be modified to match the spacing requirements of a downstream packaging machine such as a thermoformer. The operation of a packaging machine may involve laying a film over a set of product packs and so it is desirable to have a small distance between packs in order to minimise the wastage of film between the packs.

By running the conveyor belts of the pitch adjustment conveyor at a lower velocity than those of the flap-folding module, the spacings will be reduced. Alternatively, the velocity of the conveyor belts of the pitch adjustment conveyor may match that of the conveyor belts of the flap-folding module (at least a majority of the time) whilst a product pack is in contact with both belts, and is then reduced before the next product pack passes into contact with the conveyor belts of the pitch adjustment conveyor.

As a result, the pitch between consecutive product packs may be reduced from distance A shown FIG. 10, to distance B, marked on FIG. 11.

A set of flap hold-down guides 112 may be provided above the conveyors of the pitch adjustment conveyor to ensure that the flaps of the product packs remain in their folded-over configuration. The guides comprise a set of cylindrical rods which extend parallel with the product flow path. Mounting structures 114 provided to carry the hold-down guides may facilitate adjustment of the height of the guides to suit different product pack formats.

It will be appreciated that references herein to perpendicular or parallel relative orientations and the like are to be interpreted as defining perpendicular or parallel relationships between components within practical tolerances.

The specification can be readily understood with reference to the following Numbered Paragraphs:

Numbered Paragraph 1. A flap-folding module for processing a food product lying on a sheet of material to fold a portion of the sheet over the food product, the module comprising:
- a conveyor system to carry the food product and sheet along a product flow path through the module;
- a gas jet outlet device to provide an upward pulse of gas to raise a leading edge of the sheet as it passes over the gas jet outlet device; and
- an edge catch device located above the product flow path for receiving the raised leading edge, temporarily retaining the leading edge whilst the food product passes beneath the edge catch device, thereby folding a leading portion of the sheet over at least part of the food product, and then releasing the leading edge as the food product and sheet continue along the product flow path,
- wherein the conveyor system comprises a mid-conveyor section and an upstream conveyor section which is upstream of the mid-conveyor section, and the upstream conveyor section is pivotable relative to the mid-conveyor section about a pivot axis which extends transversely across the product flow path.

Numbered Paragraph 2. A module of Numbered Paragraph 1 wherein the upstream conveyor section is pivotable downwardly relative to the mid-conveyor section to a location beneath the product flow path.

Numbered Paragraph 3. A module of Numbered Paragraph 1 or Numbered Paragraph 2, wherein the conveyor system includes two sets of conveyor belts, with the belts of a first set arranged alternately with belts of a second set across the product flow path, and with upstream portions of the first set extending further upstream than the upstream ends of the second set.

Numbered Paragraph 4. A module of Numbered Paragraph 3, wherein the upstream portions of the first set are located in the pivotable upstream conveyor section of the conveyor system.

Numbered Paragraph 5. A module of Numbered Paragraph 3 or Numbered Paragraph 4, wherein the gas jet outlet device is arranged to provide an upward pulse of gas between the upstream portions of at least two of the belts of the first set.

Numbered Paragraph 6. A module of any of Numbered Paragraphs 3 to 5, wherein downstream portions of the second set of belts extend further downstream than the downstream ends of the first set of belts.

Numbered Paragraph 7. A module of any of Numbered Paragraphs 3 to 6, wherein each belt of the first set of belts extends around a drive roller which is located at the downstream end of the belts, and each belt of the second set of belts extends around a drive roller which is located at the upstream end of the belts.

Numbered Paragraph 8. A module of Numbered Paragraph 7, wherein each belt of the first set of belts extends around a nose roller which is located at the upstream end of the belts, and each belt of the second set of belts extends around a nose roller which is located at the downstream end of the belts, and the diameter of the nose roller associated with each belt is less than the diameter of the respective drive roller.

Numbered Paragraph 9. A module of any of Numbered Paragraphs 3 to 8, wherein the upstream conveyor section includes a set of pivotable arms, each having a nose roller located at its distal end, with a belt of each of the first set of belts extending around a respective nose roller.

Numbered Paragraph 10. A food product processing line comprising a flap-folding module of any preceding Numbered Paragraph and an adjacent rotation module upstream of the flap-folding module, wherein the rotation module comprises:
- a product conveyor for conveying food products in a conveyance direction through the rotation module, wherein the product conveyor defines a product support surface;
- a rotation module base; and
- a product conveyor support for carrying the product conveyor, wherein the product conveyor support is rotatably mounted on the rotation module base for rotation about a rotation axis which is perpendicular to the product support surface.

Numbered Paragraph 11. A processing line of Numbered Paragraph 10, wherein the upstream conveyor section of the flap-folding module is pivotable between raised and lowered configurations, and the flap-folding module and rotation module are configured such that when the upstream conveyor section is in its raised configuration, food products conveyed along the product flow path by the product conveyor flow onto the upstream conveyor section, and when the upstream conveyor section is in its lowered configuration, the product conveyor is able to rotate relative to the rotation module base whilst spaced from the upstream conveyor section.

Numbered Paragraph 12. A food product processing line of Numbered Paragraph 10 or Numbered Paragraph 11, wherein the product conveyor support is configured to rotate from an original orientation with its conveyance direction aligned with the product flow path, through 180° in one direction about the rotation axis relative to the rotation module base, to a rotated orientation in which its conveyance direction is again aligned with the product flow path, and then rotate through 180° in the opposite direction about the rotation axis back to its original orientation.

Numbered Paragraph 13. A food product processing line of Numbered Paragraph 12, wherein the product conveyor is configured to convey food products along the product flow path in its original orientation and is reversible to convey food products in the same direction along the product flow path in its rotated orientation.

Numbered Paragraph 14. A flap-folding module of any of Numbered Paragraphs 1 to 9, or a food product processing line of any of Numbered Paragraphs 10 to 13, in combination with a pitch adjustment conveyor which is downstream of the flap-folding module, wherein the pitch adjustment conveyor is configured to reduce the pitch between consecutive food products relative to the pitch between consecutive food products travelling through the flap-folding module.

Numbered Paragraph 15. A flap-folding module or a processing line of Numbered Paragraph 14, wherein the pitch adjustment conveyor is configured to carry food products along the product flow path at a lower velocity than the flap-folding module.

Numbered Paragraph 16. A flap-folding module or a processing line of Numbered Paragraph 14, wherein the pitch adjustment conveyor is configured to carry food products along the product flow path at a first velocity during the transfer of a food product from the flap-folding module to the pitch adjustment conveyor and to carry food products at a second velocity between the transfer of consecutive food products from the flap-folding module to the pitch adjustment conveyor, wherein the second velocity is less than the first velocity.

Numbered Paragraph 17. A method of operating a food processing line of any of Numbered Paragraphs 10 to 16 comprising the steps of:
  lowering the upstream conveyor section of the flap-folding module to its lowered configuration;
  rotating the product conveyor of the rotation module about its rotation axis; and
  raising the upstream conveyor section to its raised configuration.

The invention claimed is:

1. A flap-folding module for processing a food product lying on a sheet of material to fold a portion of the sheet over the food product, the module comprising:
  a conveyor system to carry the food product and sheet along a product flow path through the module;
  a gas jet outlet device to provide an upward pulse of gas to raise a leading edge of the sheet as it passes over the gas jet outlet device; and
  an edge catch device located above the product flow path for receiving the raised leading edge, temporarily retaining the leading edge whilst the food product passes beneath the edge catch device, thereby folding a leading portion of the sheet over at least part of the food product, and then releasing the leading edge as the food product and sheet continue along the product flow path,
  wherein the conveyor system comprises a mid-conveyor section and an upstream conveyor section which is upstream of the mid-conveyor section, and the upstream conveyor section is pivotable relative to the mid-conveyor section about a pivot axis which extends transversely across the product flow path,
  wherein the conveyor system includes two sets of conveyor belts, with the belts of a first set are arranged alternately with belts of a second set across the product flow path, and with upstream portions of the first set extending further upstream than upstream ends of the second set.

2. The flap-folding module of claim 1 wherein the upstream conveyor section is pivotable downwardly relative to the mid-conveyor section to a location beneath the product flow path.

3. The flap-folding module of claim 1, wherein the upstream portions of the first set are located in the pivotable upstream conveyor section of the conveyor system.

4. The flap-folding module of claim 1, wherein the gas jet outlet device is arranged to provide an upward pulse of gas between the upstream portions of at least two of the belts of the first set.

5. The flap-folding module of claim 1, wherein downstream portions of the second set of belts extend further downstream than downstream ends of the first set of belts.

6. The flap-folding module of claim 1, wherein each belt of the first set of belts extends around a first drive roller which is located at a downstream end of each of the first set of belts, and each belt of the second set of belts extends around a second drive roller which is located at each upstream end of the second set of belts.

7. The flap-folding module of claim 6, wherein each belt of the first set of belts extends around a first nose roller which is located at each upstream end of each of the first set of belts, and each belt of the second set of belts extends around a second nose roller which is located at a downstream end of each of the second set of belts, and a diameter of the respective first or second nose roller associated with the respective first or second set of belts is less than a diameter of the respective first or second drive roller.

8. The flap-folding module of claim 1, wherein the upstream conveyor section includes a set of pivotable arms, each pivotable arm having a nose roller located at its distal end, with a belt of each of the first set of belts extending around a respective nose roller.

9. The flap-folding module of claim 1, in combination with a pitch adjustment conveyor which is downstream of the flap-folding module, wherein the pitch adjustment conveyor is configured to reduce the pitch between consecutive food products relative to the pitch between consecutive food products travelling through the flap-folding module.

10. The flap-folding module of claim 9, wherein the pitch adjustment conveyor is configured to carry food products along the product flow path at a lower velocity than the flap-folding module.

11. The flap-folding module of claim 9, wherein the pitch adjustment conveyor is configured to carry food products along the product flow path at a first velocity during the transfer of a food product from the flap-folding module to the pitch adjustment conveyor and to carry food products at a second velocity between the transfer of consecutive food products from the flap-folding module to the pitch adjustment conveyor, wherein the second velocity is less than the first velocity.

12. A food product processing line comprising the flap-folding module of claim 1 and an adjacent rotation module upstream of the flap-folding module, wherein the rotation module comprises:
  a product conveyor for conveying food products in a conveyance direction through the rotation module, wherein the product conveyor defines a product support surface;
  a rotation module base; and
  a product conveyor support for carrying the product conveyor, wherein the product conveyor support is rotatably mounted on the rotation module base for rotation about a rotation axis which is perpendicular to the product support surface.

13. The food product processing line of claim 12, wherein the upstream conveyor section of the flap-folding module is pivotable between raised and lowered configurations, and the flap-folding module and the rotation module are configured such that when the upstream conveyor section is in its raised configuration, food products conveyed along the product flow path by the product conveyor flow onto the upstream conveyor section, and when the upstream conveyor section is in its lowered configuration, the product conveyor is able to rotate relative to the rotation module base whilst spaced from the upstream conveyor section.

14. The food product processing line of claim 12, wherein the product conveyor support is configured to rotate from an original orientation with its conveyance direction aligned with the product flow path, through 180° in one direction about the rotation axis relative to the rotation module base, to a rotated orientation in which its conveyance direction is again aligned with the product flow path, and then rotate through 180° in an opposite direction to the one direction about the rotation axis back to its original orientation.

15. The food product processing line of claim 14, wherein the product conveyor is configured to convey food products along the product flow path in its original orientation and is reversible to convey food products in the same direction along the product flow path in its rotated orientation.

\* \* \* \* \*